US008565512B2

(12) United States Patent
Jung et al.

(10) Patent No.: US 8,565,512 B2
(45) Date of Patent: Oct. 22, 2013

(54) METHOD, MEDIUM, AND SYSTEM GENERATING DEPTH MAP OF VIDEO IMAGE

(75) Inventors: Yong Ju Jung, Daejeon (KR); Changick Kim, Daejeon (KR); Dusik Park, Suwon-si (KR); Youngwoo Kim, Seoul (KR); Jaeseung Ko, Seoul (KR)

(73) Assignees: Samsung Electronics Co., Ltd., Suwon-Si (KR); Information and Communications University, Daejeon (KR)

( * ) Notice: Subject to any disclaimer, the term of this patent is extended or adjusted under 35 U.S.C. 154(b) by 1231 days.

(21) Appl. No.: 12/155,134

(22) Filed: May 29, 2008

(65) Prior Publication Data

US 2009/0196492 A1 Aug. 6, 2009

(30) Foreign Application Priority Data

Feb. 1, 2008 (KR) .................. 10-2008-0010819

(51) Int. Cl.
*G06K 9/46* (2006.01)
(52) U.S. Cl.
USPC ............ 382/154; 382/170; 382/195; 345/419
(58) Field of Classification Search
USPC .......................... 382/154, 170, 195; 345/419; 348/E13.003
See application file for complete search history.

(56) References Cited

PUBLICATIONS

Battiato et al: "3D stereoscopic image pairs by depth-map generation", Proc. of the 2nd intl. Sym. 3DPVT, 2004.*
Seo et al: "An intelligent display scheme of soccer video on mobile devices", CSVT-IEEE, 2007.*
Ko et al: "2D-to-3D stereoscopic conversion: depth-map estimation in a 2D single-view image", Proc. of SPIE, 2007.*
Keewon Seo, et al., "*An Intellegent Display Scheme of Soccer Video on Mobile Devices*", IEEE Transactions on Circuits for Video Technology, vol. 17, No. 10, Oct. 2007, pp. 1395-1401.
Toshiyuki Okino et al., "New television with 2D/3D image conversion technologies", SPIE, vol. 2653, pp. 96-103.
R. C. Gonzalez, R.E. Woods, Digital Image Processing Second Edtion, Prentice Hall, 2002, pp. 294-303.
Sergio Aguirre Valencia et al., "Synthesizing Stereo 3D Views from Focus Cues in Monoscopic 2D Images", SPIE, vol. 5006, 2003, pp. 377-388.
Wa James Tam et al., "Depth Image Based Rendering for Multiview Stereoscopic Displays: Role of Information at Object Boundaries", Proceedings of SPIE, vol. 6016, pp. 1-11.

(Continued)

*Primary Examiner* — Kim Vu
*Assistant Examiner* — Ruiping Li
(74) *Attorney, Agent, or Firm* — Staas & Halsey LLP

(57) ABSTRACT

A method, medium, and system generating a depth map of a video image are provided. The depth map generating method extracts the ground of a video image other than an object from the video image, classifies the video image as a long shot image or a non-long shot image based on a distribution value of the extracted ground, calculates a depth value gradually varied along a predetermined direction of the extracted ground when the video image corresponds to the long shot image and calculates a depth value based on the object when the video image corresponds to the non-long shot image. Accordingly, a sense of space and perspective can be effectively given to even a long shot image in which the ground occupies a large part of the image and a stereoscopic image recognizable by a viewer can be generated even if rapid object change is made between scenes in a video image.

20 Claims, 11 Drawing Sheets
(7 of 11 Drawing Sheet(s) Filed in Color)

(56) References Cited

PUBLICATIONS

Ilkwon Park et al., "Robust Zooming Motion Detection for Motion-Based Stereoscopic Conversion", Proceedings of the International Workshop on Advanced Image Technology, 2007, pp. 370-374.

Baxter J. Garcia, "Approaches to stereoscopic video on spatio-temporal interpolation", SPIE, vol. 2653, pp. 85-95.

Joohwan Kim et al., "Steroscopic conversion of two-dimensional movie encoded in MPEG-2", Proceedings of SPIE, vol. 6311, pp. 1-8.

* cited by examiner (510)  (520)  (530)  (540)

(550)  (560)

(851)　　　　(852)　　　　(853)

METHOD, MEDIUM, AND SYSTEM GENERATING DEPTH MAP OF VIDEO IMAGE

CROSS-REFERENCE TO RELATED APPLICATIONS

This application claims the priority benefit of Korean Patent Application No. 10-2008-0010819, filed on Feb. 1, 2008, in the Korean Intellectual Property Office, the disclosure of which is incorporated herein in its entirety by reference.

BACKGROUND

1. Field

One or more embodiments of the present invention relate to method, medium, and system generating a depth map from a two-dimensional (2D) video image in order to convert the 2D video image to a three-dimensional (3D) stereoscopic image.

2. Description of the Related Art

Attention has been focused on 3D image displaying techniques for providing stereoscopic images to viewers with the development of multimedia and broadcasting techniques. A 3D image is a stereoscopic image obtained by adding a depth axis to a 2D image composed of vertical and horizontal axes.

Two methods are proposed in order to produce stereoscopic images. The first method captures an image using at least two cameras to generate left-eye and right-eye images and produces a stereoscopic image from the left-eye and right-eye images. The second method analyzes and processes an image captured with a single view point (for example, a single camera) to generate left-eye and right-eye images and produces a stereoscopic image from the left-eye and right-eye images. The former produces new video contents while the latter converts the existing video contents to stereoscopic images. Considering that most existing video contents are 2D image produced in the past, it can be known that the latter technique can be useful to generate stereoscopic images.

The latter technique generates a depth map for generating a 3D stereoscopic image from a 2D image. The depth map is a group of information determining depth values of individual objects and the ground of the 2D image in the 3D stereoscopic image. For example, when a person stands in a playground, the playground has a depth value smaller than that of the person. Since the 3D stereoscopic image is generated based on the depth map, it is very important to generate the depth map accurately and efficiently in an image conversion technique.

SUMMARY

One or more embodiments of the present invention provide method, medium, and system generating a depth map from a 2D image, which solve problems that a spatial variation in a 2D image is small when the ground of the 2D image occupies a large part of the 2D image and motion information of an image is difficult to acquire when the image includes a plurality of small objects and achieve rapid object change between scenes in a video image to generate an image recognizable by viewers.

According to an aspect of the present invention, there is provided a method for generating a depth map implemented by at least one processing element, which includes extracting the ground from a video image other than an object from the video image; classifying the video image as a long shot image or a non-long shot image based on a distribution value of the extracted ground; calculating a depth value gradually varied along a predetermined direction of the extracted ground when the video image corresponds to the long shot image and calculating a depth value based on the object when the video image corresponds to the non-long shot image; and generating the depth map based on the depth value.

According to another aspect of the present invention, there is a method for generating and displaying a stereoscopic image from a video image comprising an object and ground, the method including calculating a depth value gradually varied along a predetermined direction of the ground of the video image when the video image corresponds to a long shot image and calculating depth value based on the object when the video image corresponds to the non-long shot image; generating a depth map based on the depth value; generating the stereoscopic image based on the depth map; and displaying the stereoscopic image on a display unit.

According to another aspect of the present invention, there is provided a computer readable recording medium storing a program to be executed to implement the aforementioned depth map generating methods on a computer.

According to another aspect of the present invention, there is provided at least one computer readable recording medium storing computer readable instructions that control at least one processing element to implement the aforementioned depth map generating methods.

According to another aspect of the present invention, there is provided system generating a depth map, which includes a ground extractor to extract the ground of a video image other than an object from the video image; an image classification unit to classify the video image as a long shot image or a non-long shot image based on a distribution value of the extracted ground; and a depth value calculator to calculate a depth value gradually varied along a predetermined direction of the extracted ground in order to generate a depth map when the video image corresponds to the long shot image and to calculate a depth value based on the object in order to generate a depth map when the video image corresponds to the non-long shot image.

According to another aspect of the present invention, there is a system for generating and displaying a stereoscopic image from a video image comprising an object and ground, the system including a depth value calculator to calculate a depth value gradually varied along a predetermined direction of ground of the video image in order to generate a depth map when the video image corresponds to the long shot image and to calculate depth value based on the object in order to generate the depth map when the video image corresponds to the non-long shot image; a stereoscopic image generator to generate the stereoscopic image based on the depth map; and a display unit to display the stereoscopic image.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features, and advantages will become apparent and more readily appreciated from the following description of exemplary embodiments, taken in conjunction with the accompanying drawings of which.

DETAILED DESCRIPTION OF EMBODIMENTS

Figure 1:
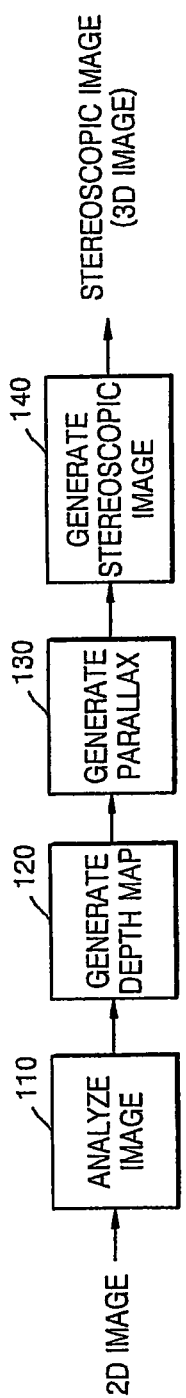
FIG. 1 illustrates a process of converting a 2D image to a 3D stereoscopic image.

Reference will now be made in detail to exemplary embodiments, examples of which are illustrated in the accompanying drawings, wherein like reference numerals refer to the like elements throughout. In this regard, exemplary embodiments of the present invention may be embodied in many different forms and should not be construed as being limited to exemplary embodiments set forth herein. Accordingly, exemplary embodiments are merely described below, by referring to the figures, to explain aspects, features, and advantages of the present invention.

In general, image information that can be used to generate a depth map includes motion information of objects included in an image. When the ground of a 2D image occupies a large part of the 2D image, it is difficult to extract motion information because a spatial variation in the 2D image is small. Furthermore, when rapid object change between scenes is made between a current frame and the next frame of a video image, convergence inconsistency in human visual recognition is generated, and thus it is difficult for a viewer to correctly recognize the video image. Accordingly, following exemplary embodiments will present a method, medium, and system generating a depth map from a 2D video image accurately and effectively in consideration of the aforementioned problems and provide video as a 2D source image used to generate a 3D stereoscopic image. In the following exemplary video, a playing field corresponds to the ground and a soccer player corresponds to an object.

FIG. 1 illustrates a process of converting a 2D image to a 3D stereoscopic image. Referring to FIG. 1, the 2D image is received and analyzed in operation 110. In this operation, characteristics of the 2D image are extracted through various pixel-based or block-based analysis methods in order to collect information used to generate a depth map.

In operation 120, the depth map is generated based on the image information analyzed in operation 110. This operation will be explained in more detail through following exemplary embodiments. A parallax is generated using the depth map in operation 130. A person recognizes the stereoscopic effect or depth of an object using two eyes. That is, when a person sees an object, different images of the object are respectively generated through two eyes of the person and these images are appropriately combined, and thus the person recognizes the stereoscopic effect or depth of the object. Accordingly, two images based on a visual difference between a left eye and a right eye are generated from a single 2D image in consideration of the human visual recognition characteristic. The visual difference between the left eye and the right eye corresponds to the parallax generated in operation 130. A stereoscopic image is generated using the parallax in operation 140.

Figure 2:
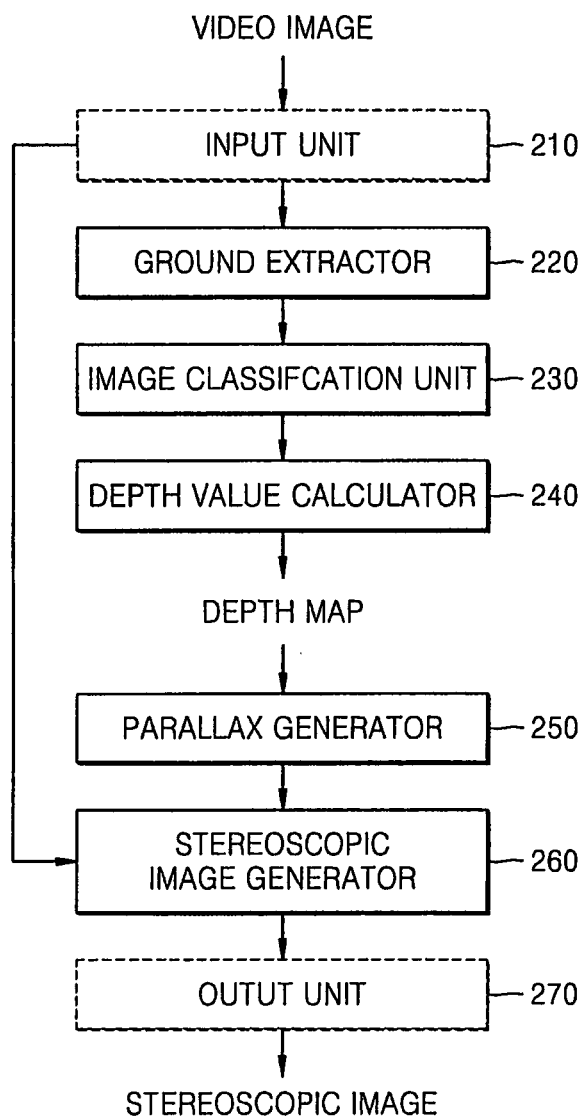
FIG. 2 illustrates system converting a 2D image to a 3D stereoscopic image, which includes a depth map generating system according to an exemplary embodiment of the present invention.

FIG. 2 illustrates system converting a 2D image to a 3D stereoscopic image, which includes a depth map generating system according to an exemplary embodiment of the present invention. Referring to FIG. 2, an input unit 210 receives a 2D video image used to generate the 3D stereoscopic image. A process of generating a depth map from the 2D video image received through the input unit 210 is explained with reference to FIGS. 2 and 3.

Figure 3:
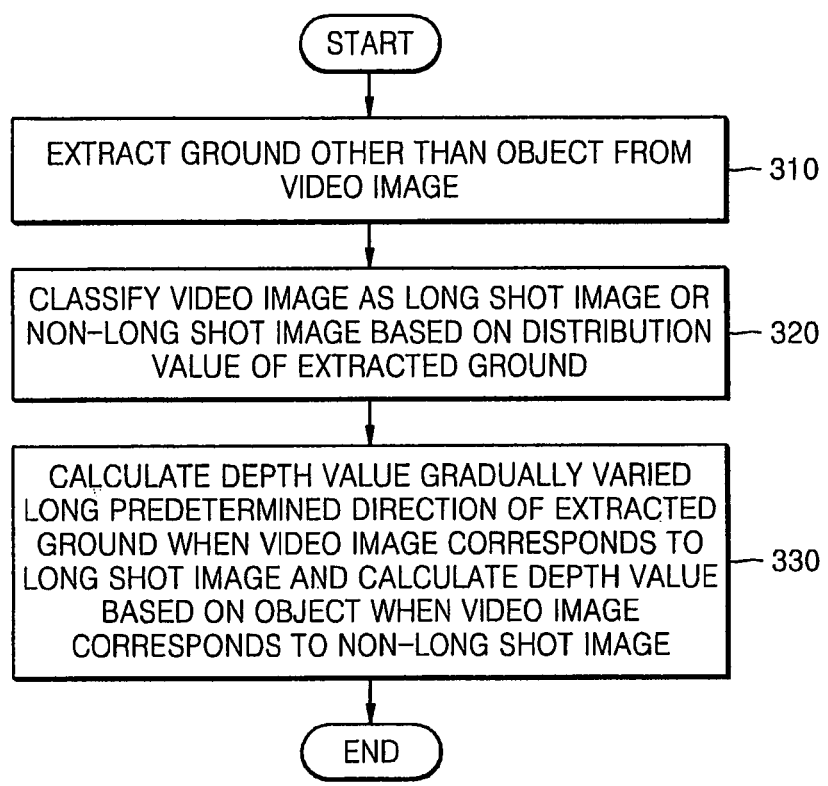
FIG. 3 illustrates a depth map generating method according to an exemplary embodiment of the present invention.

A ground extractor 220 extracts the ground of the 2D video image from the 2D video image, which corresponds to operation 310 of FIG. 3. The ground can have image characteristic distinguished from an object of the 2D video image, and the image characteristic can include a uniform color or a specific pattern. For example, when the video image is a soccer video, a playing field corresponds to the ground and has a characteristic that it is green. The ground extractor 220 can extract the ground from the 2D image using the color or pattern of the ground. It will be understood by those of ordinary skill in the art that the ground extracting method can be applied to a variety of 2D video images including an image of people who swim in a swimming pool and an image of an air show that shows an acrobatic flight.

An image classification unit 230 classifies the 2D video image as a long shot image or a non-long shot image based on a distribution value of the ground extracted through the ground extractor 220. This operation corresponds to operation 320 of FIG. 3. In the case of a long shot image, the ground occupies a large part of the image, and thus it is advantageous to represent the depth of the image using the ground rather than an object occupying a small part of the image. In the case of a non-long shot image, on the other hand, an object occupies a large part of the image so that it is advantageous to represent the depth of the image using the object. In the current exemplary embodiment and following exemplary embodiments of the present invention, the depth value of a ground or an object which occupies a large part of an image is obtained. Accordingly, the image classification unit 230 classifies the 2D image as the long shot image or the non-long shot image based on the aforementioned difference between the long shot image and the non-long shot image.

A depth value calculator 240 calculates a depth value gradually varied along a specific direction of the ground extracted through the ground extractor 220 when the video image corresponds to a long shot image and calculates a depth value based on the object when the video image corresponds to a non-long shot image. This operation corresponds to operation 330 of FIG. 3. As described above, a depth value is calculated based on the ground in the case of a long shot image. This depth value is calculated in such a manner that an object, which is recognized to be close to a viewer, has a larger depth value and an object, which is recognized to be far from the viewer, has a smaller depth value. An object located on a lower part of an image displayed on a display device such as a TV receiver is closer to a viewer, in general, and thus the depth of an upper part of the image displayed on the display device is greater than the depth of the lower part of the image. That is, the lower part of the image is close to a camera that captures the image and the upper part of the image is far from the camera. The depth value representation direction can vary according to image capturing angle or object to be represented.

A depth map is generated using the depth value calculated through the depth value calculator 240. A parallax generator 250 generates a parallax by which a person recognizes a stereoscopic effect using the depth map. A stereoscopic image generator 260 receives the video image from the input unit 210, receives the parallax from the parallax generator 250 and generates a stereoscopic image. The generated stereoscopic image is output through an output unit 270 such as a display device. Then, a viewer sees the stereoscopic image and recognizes the stereoscopic effect and depth of the stereoscopic image.

Figure 4:
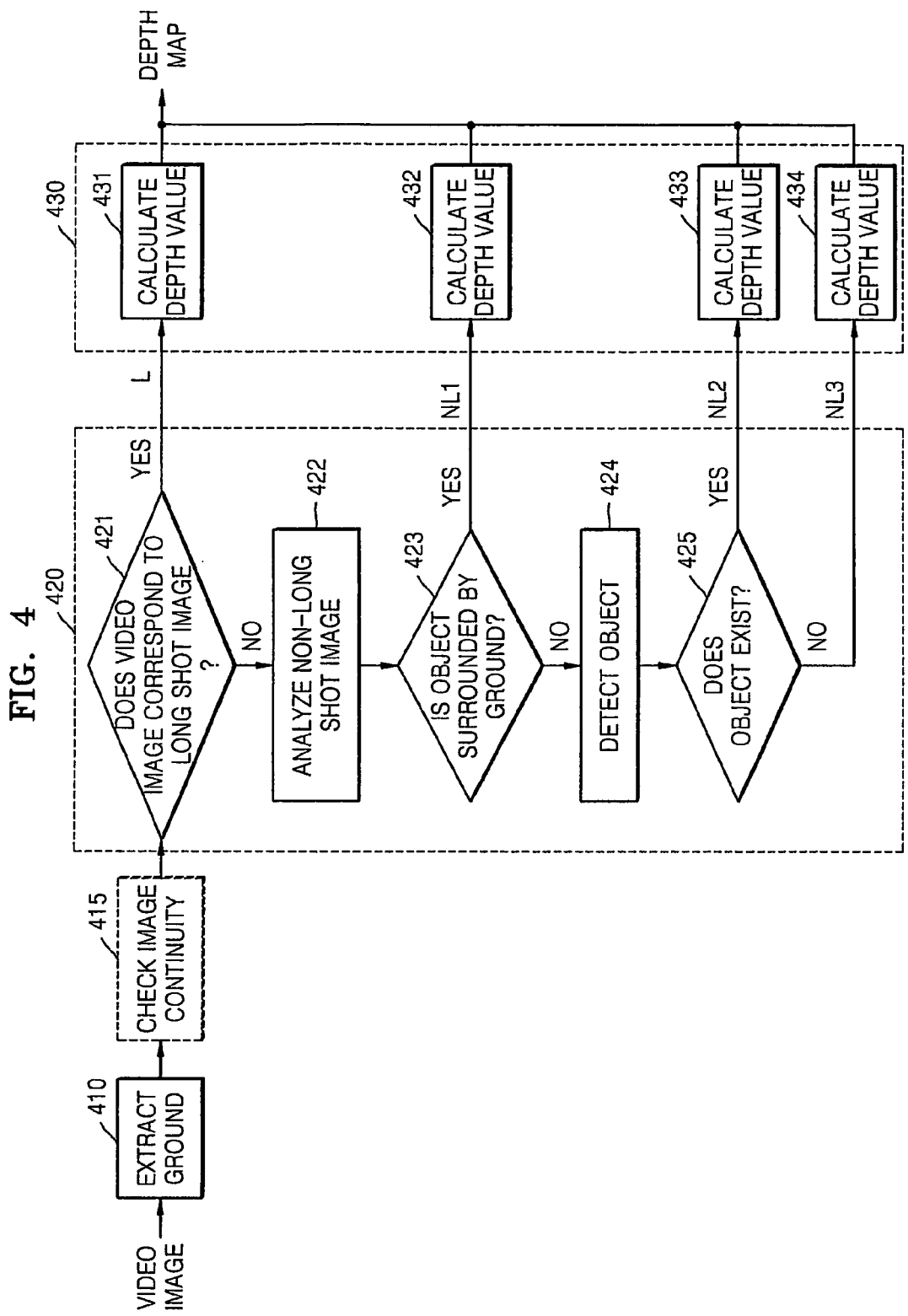
FIG. 4 illustrates the depth map generating method illustrated in FIG. 3 in more detail.

FIG. 4 illustrates the depth map generating method illustrated in FIG. 3 in more detail. The depth map generating method will now be explained in more detail with reference to FIGS. 2 and 4.

A 2D video image is received and the ground of the 2D video image is extracted from the 2D video image in operation 410. When the received 2D video image is a soccer video, a G pixel value is greater than an R pixel value and the R pixel value is greater than a B pixel value in RGB pixel values corresponding to a playing field of the soccer video. Under this condition, the ground is extracted as binary data from the received 2D video image using a ground pixel detection algorithm. The ground pixel detection algorithm is easily understood by those of ordinary skill in the art, which is disclosed in an article entitled "An Intelligent Display Scheme of Soccer Video for Mobile Devices" by Keewon Seo, Jaeseung Ko, Ilkoo Ahn and Changick Kim in IEEE Transactions on Circuits and Systems for Video Technology (CSVT), vol. 17, no. 10, pp. 1395-1401, 2007. The binary data $GRD_{Binary}(x, y)$ corresponding to the ground (for example, the playing field of the soccer video) is represented as follows.

$$GRD_{Binary}(x, y) = \begin{cases} 1, & \text{if } (x, y) \text{ is ground pixel} \\ 0, & \text{otherwise} \end{cases} \quad \text{[Equation 1]}$$

Here, x and y respectively denote coordinates of horizontal and vertical axes of the video image. In Equation 1, the binary data $GRD_{Binary}(x, y)$ is 1 if the ground corresponds to a ground pixel and 0 otherwise.

Then, the video image is divided into 16×16 blocks $B_{ij}$ and a ground block map $GB(i, j)$ is generated using Equation 2.

$$GB(i, j) = \begin{cases} 1, & \text{if } \dfrac{\sum_{(x,y) \in B_y} GRD_{Binary}(x, y)}{16 \times 16} \geq 0.5 \\ 0, & \text{otherwise} \end{cases} \quad \text{[Equation 2]}$$

Here, i and j respectively denote block coordinates having ranges 0<i<frame_width/16 and 0<j<frame_height/16.

According to Equation 2, a corresponding block is considered as a ground when the binary data $GRD_{Binary}(x, y)$ of the ground included in the ground block map $GB(i, j)$ is greater than or equal to ½ (the ground block map has a value 1) and the corresponding block is not considered as a ground otherwise (the ground block map has a value 0).

The correlation between the ground block map $GB(i, j)$ obtained through Equation 2 and surrounding blocks is measured and a small noise block (a block other than the ground) included in the ground is removed so as to obtain a refined ground block map $GB_{refined}$. The refined ground block map $GB_{refined}$ can be obtained through various methods. For example, a current block is considered as a ground only when at least one of blocks surrounding the current block corresponds to the ground.

To separate a pixel-based ground region and a pixel-based audience region of the soccer video from each other, a refined ground region $GRD_{refined}(x, y)$ can be extracted using Equation 3.

$$GRD_{refined}(x, y) = \begin{cases} GRD_{Binary}(x, y), & \text{if } (x, y) \in GB_{refined} \\ 0, & \text{otherwise} \end{cases} \quad \text{[Equation 3]}$$

In Equation 3, the previously calculated binary data $GRD_{Binary}(x, y)$ of the ground is maintained only when a corresponding coordinate (x, y) belongs to the refined ground block map $GB_{refined}$ and the refined ground region $GRD_{refined}(x, y)$ has a value 0 otherwise.

Figure 5A:
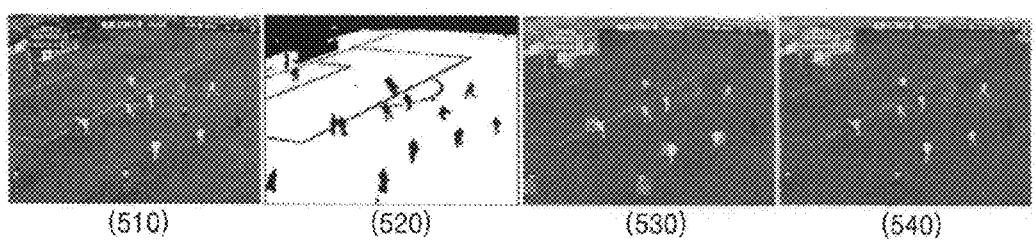
FIG. 5A illustrates images for explaining a process of extracting the ground from a video image.

The aforementioned process is explained with reference to FIG. 5A which illustrates a process of extracting the ground of a video image from the video image. In FIG. 5A, reference numerals 510, 520, 530 and 540 respectively represent the original video image, a binary data map of the extracted ground, a ground block map and a refined ground block map. Referring to FIG. 5A, the binary data map 520 of the pixel-based ground is calculated from the original video image 510. In the binary data map 520 of the ground, the ground corresponds to a white region and objects other than the ground correspond to a block region. The ground block map 530 represents the binary data map 520 as 16×16 blocks. The refined ground block map 540 is obtained by refining the ground block map 530 in consideration of the correlation between each block and surrounding blocks.

Referring back to FIG. 4, the type of the received video image is classified using the ground extracted in operation 410. Prior to the operation of classifying the type of the video image, image continuity between a current frame and a previous frame of the video image is checked in operation 415. The image continuity corresponds to a temporal variation extent of each scene of a video image. For example, when a player is running in a soccer video, a scene in which the left foot and the right foot of the player are alternately moved is seen. In this case, the soccer video has continuity. When a scene in which a player is running is abruptly changed to a scene showing the face of a manager, there is no continuity between the previous scene (corresponding to a previous frame of a video image) and the current scene (corresponding to a current frame of the video image).

In the current exemplary embodiment of the present invention, the image continuity is used to distinguish scenes from each other. If scenes are not distinguished from each other in a video image, the characteristic of every frame of the video image has to be analyzed and the type of every frame has to be classified. Accordingly, if the image continuity is checked in operation 415 and operation 420 of classifying the video image according to the checking result is selectively performed, the number of unnecessary computations can be reduced.

When a current image is a continuous image in operation 415, a previously classified image type can be used. That is, operation 420 is omitted and operation 430 of calculating depth values from the image can be performed. When the current image is not a continuous image, operation 420 is carried out to classify the type of the image.

Specifically, it is checked whether the current image is a long shot image. There are various methods of distinguishing a long shot image from a non-long shot image. In the current exemplary embodiment of the present invention, ground blocks of the current image are checked in the horizontal direction and the current image is classified as a non-long shot image if there is a ground block column having a length smaller than ⅓ of the height of the image and classified as a long shot image otherwise. This classification method is exemplary and those of ordinary skill in the art can derive various methods of distinguishing the long shot image from the non-long shot image.

When the current image corresponds to a long shot image in operation 421, a depth value gradually varied from one end of the ground extracted in operation 410 to the other end along a specific direction is calculated and a depth value corresponding to an object other than the ground is calculated such that the depth value is greater than that of the neighboring ground in operation 431. In the case of the aforementioned soccer video, one end of the ground corresponds to the bottom end of the soccer video and the other end of the ground corresponds to the top end of the soccer video. In a stereoscopic image, an object (for example, a soccer player) must be more distinct than the ground (for example, a playing field), and thus the object has a depth value greater than the depth value of the ground adjacent thereto. A depth map generated from the depth values calculated in operation 431 has gradually varying depth values, and thus the depth map is referred to as a gradient depth map hereinafter. A method of generating the gradient depth map will now be explained with reference to FIG. 5B.

Figure 5B:
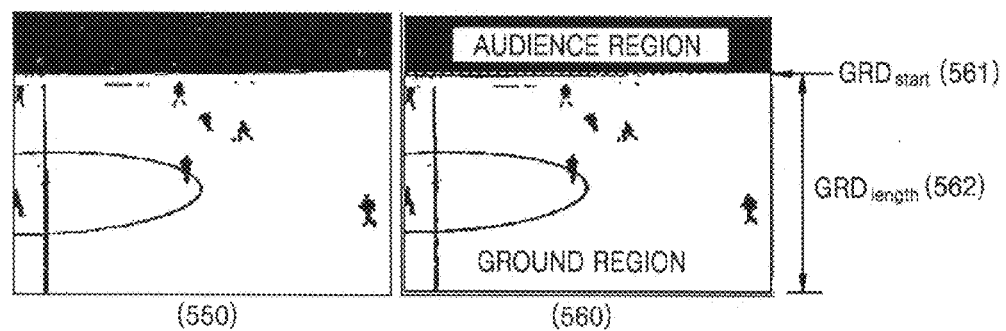
FIGS. 5B and 5C illustrate images for explaining a process of generating a depth map from a long shot image.

FIG. 5B illustrates a binary data map 550 of a ground and a refined ground map 560. A ground (playing field) region and an audience region in the refined ground map 560 are separated from each other and the start point of the ground region is defined as $GRD_{start}$ 561. When the length of the ground region from $GRD_{start}$ 561 is defined as $GRD_{length}$ 562, a unit representing a depth value is as follows.

$$\text{depth\_step} = \frac{\text{Max\_Depth}}{GRD_{length}} \qquad \text{[Equation 4]}$$

Here, depth_step denotes a depth value increase unit and Max_Depth denotes a maximum depth value of a depth map. In the current exemplary embodiment of the present invention, Max_Depth is set to 255. Depth values of the ground and an object are calculated according to Equation 5 using Equation 4.

$$\text{Depth}_{GRD}(x, y) = (y - GRD_{start}) \times \text{depth\_step}$$

$$\text{Depth}_{OBJ}(x, y) = (y - GRD_{start}) \times \text{depth\_step} + \alpha \qquad \text{[Equation 5]}$$

Here, $\text{Depth}_{GRD}(x, y)$ and $\text{Depth}_{OBJ}(x, y)$ respectively represent depth values of a ground pixel and an object pixel, and x and y which correspond to coordinate values of a pixel respectively have ranges 0<x<frame_width and $GRD_{start}$<y<frame_height. As described above, the object must be more distinct than the ground, and thus the depth value of the object is obtained by adding α to the depth value of the ground.

Figure 5C:

FIG. 5C illustrates a depth map 580 generated from a long shot image 570. In the depth map 580, the lower part of the image is whiter than the upper part of the image, which represents that the lower part of the image has depth values greater than the depth values of the upper part of the image.

Referring back to FIG. 4, when the video image does not correspond to a long shot image in operation 421, that is, when the video image corresponds to a non-long shot image, the non-long shot image is analyzed and classified according to the characteristic thereof in operation 422. The non-long shot image can be classified according to Table 1.

TABLE 1

| Type | Definition |
|---|---|
| NL1 | Image having an object surrounded by the ground |
| NL2 | Image having an object that is not surrounded by the ground and a specific color expressing the object |
| NL3 | Image in which an object is not surrounded by the ground and a specific color expressing the object does not exist |

Figure 6:
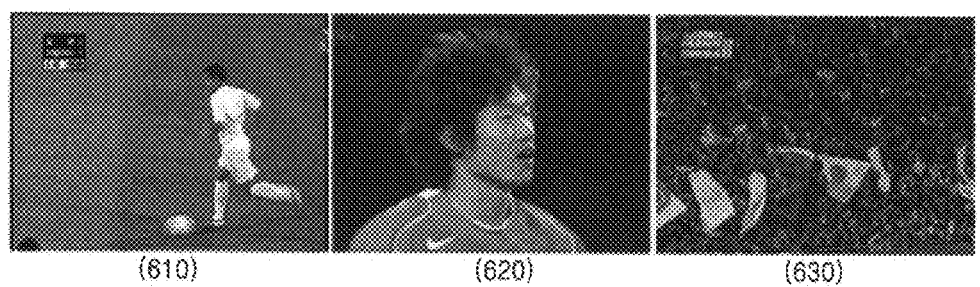
FIG. 6 illustrates three types of non-long shot images.

FIG. 6 illustrates an NL1 image 610, an NL2 image 620 and an NL3 image 630.

When the video image is a non-long shot image in operation 411, the non-long shot image is analyzed in consideration of the previously extracted distribution value of the ground and a distribution value of the ground at the end of the video image in operation 422. When a current frame of the non-long shot image is defined as $\text{frame}_{NL}(k)$, the non-long shot image is classified as an NL1 image, an NL2 image or an NL3 image using Equation 6.

$$\text{frame}_{NL}(k) = \begin{cases} NL1, & \text{if } N_{GB\_Total} \geq \theta_{GB1} \text{ and } N_{GB\_Upper} \geq \theta_{GB2} \\ NL2 \text{ or } NL3, & \text{otherwise} \end{cases} \qquad \text{[Equation 6]}$$

Here, $N_{GB\_Total}$ represents the total number of ground blocks included in the corresponding frame and $N_{GB\_Upper}$ represents the number of ground blocks included in upper half region of the corresponding frame. Furthermore, $\theta_{GB1}$ and $\theta_{GB2}$ are experimentally obtained threshold values. An object is surround by the ground in the NL1 image according to the definition of Table 1, and thus the object is considered to be surrounded by the ground when $N_{GB\_Upper}$ is greater than the threshold value $\theta_{GB2}$. Although this operation can be performed on each of the ends of four directions of the current frame for more accurate measurement, the operation is carried out only on the top end of the current frame for convenience of explanation in the current exemplary embodiment of the present invention.

It is checked whether the object is surrounded by the ground using Equation 6 in operation 423. When the non-long shot image is an NL1 image, a depth value gradually varied along a predetermined direction of the object is calculated in operation 432.

Figure 7A:
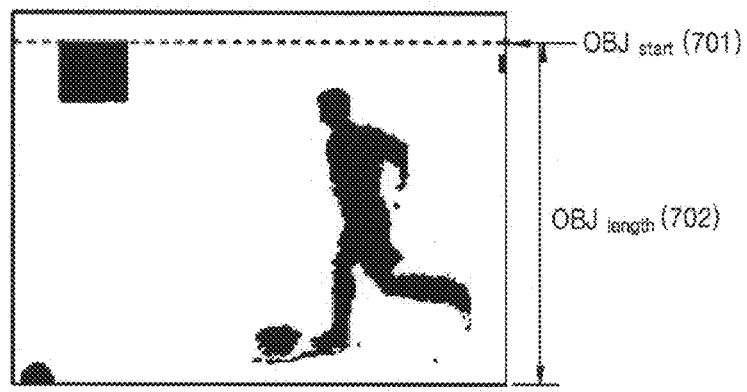
FIGS. 7A and 7B illustrate images for explaining an operation of generating a depth map when a non-long shot image corresponds to an image having an object surrounded by a ground.

FIG. 7A illustrates binary data of a ground obtained using the aforementioned ground pixel detection algorithm. In FIG. 7A, the highest position at which an object exists is defined as $OBJ_{start}$ 701 and the length from the $OBJ_{start}$ 701 to the lowest position at which an object exists is defined as $OBJ_{length}$ 702. In this case, a unit representing a depth value is as follows.

$$depth\_step = \frac{Max\_Depth}{OBJ_{length}} \quad \text{[Equation 7]}$$

The depth value of the non-long shot image can be calculated using Equation 8.

$$Depth(x, y) = \begin{cases} (y - OBJ_{start}) \times depth\_step, & \text{if } GRD_{refined}(x, y) = 0 \\ 0, & \text{otherwise} \end{cases} \quad \text{[Equation 8]}$$

In Equation 8, the depth value is calculated if a corresponding pixel is an object and the depth value is 0 otherwise.

Figure 7B:
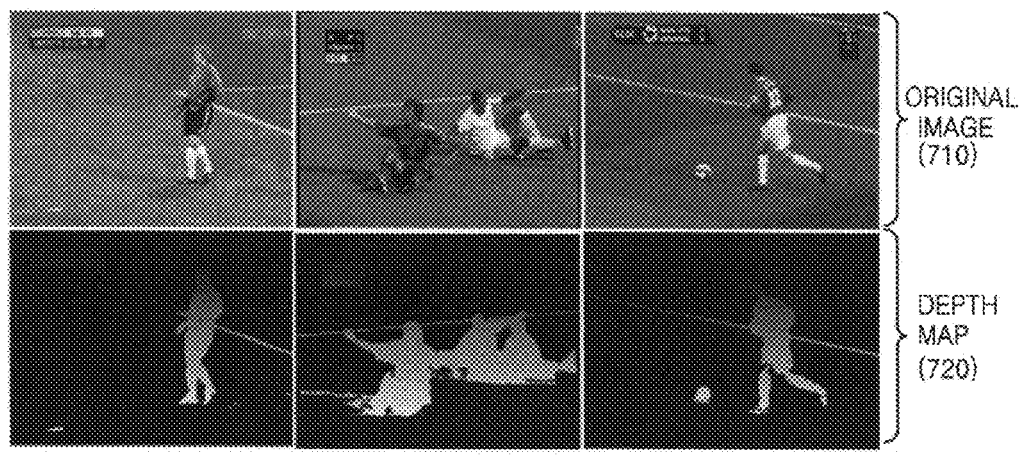

FIG. 7B illustrates a depth map 720 generated from an NL1 image 710. In the depth map 720, objects in the lower part of the image are whiter than objects in the upper part of the image.

Referring back to FIG. 4, when the object of the non-long shot image is not surrounded by the ground in operation 423, the position of the object is detected using a specific color of the object in operation 424. Here, the specific color is a predetermined color by which the object can be recognized. For example, a skin color can be a specific color when the object is a soccer player and silver can be a specific color when the object corresponds to an acrobatic plane.

The position of the object is detected in order to generate a gradient depth map based on the position of the object in the case of NL2 and NL3 images. In the current exemplary embodiment of the present invention, a skin color detection algorithm capable of identifying a soccer player is used because the soccer video is used. To effectively detect a skin color, HIS color space instead of RGB color space is used and an algorithm of detecting a skin map Skin(x, y) is as follows.

$$Skin(x, y) = \begin{cases} 1, & \text{if } 20 < H(x, y) < 60 \text{ and } 0 < I(x, y) < 200 \\ 0, & \text{otherwise} \end{cases} \quad \text{[Equation 9]}$$

Here, H(x, y) represents the hue value of a pixel (x, y) and I(x, y) represents the intensity value of the pixel (x, y). The skin map Skin(x, y) is divided into 16×16 blocks and a skin block map SB(i, j) is obtained according to Equation 10.

$$SB(i, j) = \begin{cases} 1, & \text{if } \dfrac{\sum_{(x,y)\in B_{ij}} Skin(x, y)}{16 \times 16} \geq \dfrac{2}{3} \\ 0, & \text{otherwise} \end{cases} \quad \text{[Equation 10]}$$

Here, i and j respectively represent block coordinates having ranges 0<i<frame_width/16 and 0<j<frame_height/16. In Equation 10, the skin block map SB(i, j) is 1 if the number of pixels corresponding to a skin color in a corresponding block is greater than ⅔ of the size of the corresponding block and 0 otherwise.

Figure 8A:
FIG. 8A illustrates images for explaining an operation of detecting the position of an object when a non-long shot image corresponds to an image in which the object is not surrounded by the ground.

FIG. 8A illustrates a skin block map 820 calculated from a non-long shot image 810 according to Equation 10. It is possible to obtain a refined skin block map by removing a block judged to be noise from the skin block map 820 using the correlation between a skin block and a neighboring block. A current frame is classified as an NL2 image or an NL3 image according to Equation 11 using the acquired skin block map.

$$frame_{NL}(k) = \begin{cases} NL2, & \text{if } N_{SB} \neq 0 \\ NL3, & \text{if } N_{SB} = 0 \end{cases} \quad \text{[Equation 11]}$$

Here, $frame_{NL}(k)$ represents a kth frame of the non-long shot image and $N_{SB}$ represents the number of skin blocks included in the corresponding frame. That is, the non-long shot image is classified as an NL2 image if the non-long shot image includes any skin block and classified as an NL3 image otherwise according to Equation 11.

Referring back to FIG. 4, when the position of the object (more specifically, the skin of the object) exists in operation 425 (that is, when the non-long shot image corresponds to an NL2 image), a depth value gradually varied from the center of the position of the object is calculated in operation 433. The highest block from among detected skin blocks in the NL2 image is assumed as the face of the object (soccer player). To detect the whole body of the object, the body region of the object is extended downward from the block assumed to be the face and increased in the horizontal direction block by block.

Figure 8B:
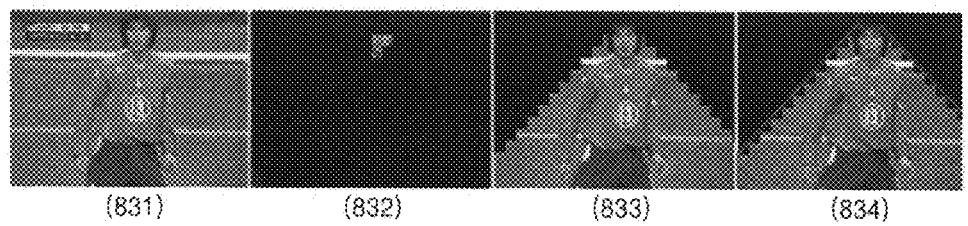
FIGS. 8B, 8C and 8D illustrate images for explaining an operation of generating a depth map when a non-long shot image corresponds to an image having an object that is not surrounded by the ground and an object exists in the non-long shot image.

Referring to FIG. 8B, skin blocks are detected from an NL2 image and the highest block from among the detected skin blocks is set to the face of an object, as illustrated in an image 832. In FIG. 8B, an image 833 represents an object region (the whole body) extended downward from the face block in a pyramid form. The blocks corresponding to the extended object region are connected in a straight line to produce an approximate object region, as illustrated in an image 834.

Then, a gradient depth map is generated from the produced object region using Gaussian distribution in order to represent more natural stereoscopic effect of an object in the current exemplary embodiment of the present invention. First of all, the probability of each pixel on horizontal rows of the image is calculated according to Equation 12.

$$P_i(j) = \frac{1}{\sqrt{2\sigma_j^2}} \exp\left(-\frac{(x - m_j)^2}{2\sigma_j^2}\right) \quad \text{[Equation 12]}$$

Figure 8C:
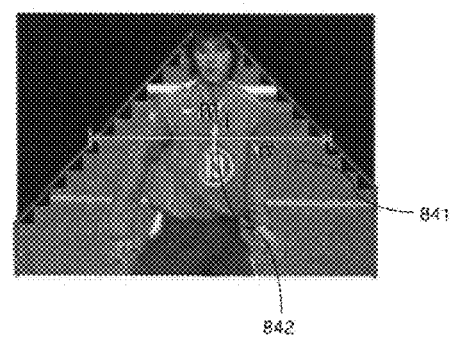

Here, $P_i(j)$ represents the probability of an ith row, and i and j respectively have ranges 0<i<frame_height$_a$ and 0<j<frame_width. In addition, $\sigma_j$ denotes the distance of each row and $m_j$ denotes the center point of $\sigma_j$. $\sigma_j$ and $m_j$ can be easily understood from FIG. 8C.

A depth value Depth(j, i) of an ith row is calculated using the calculated probability $P_i(j)$ according to Equation 13.

$$Depth(j, i) = i \times \omega_{incre} \times \frac{P_i(j)}{\underset{j}{MAX}(P_i(j))} \quad \text{[Equation 13]}$$

Here, j has a range 0<j<frame_width, $\omega_{incre}$ denotes a weight that increases the depth value, and $$\mathrm{MAX}_j(P_i(j))$$

represents the highest probability value from among the probability values of pixels of the ith row.

Figure 8D:
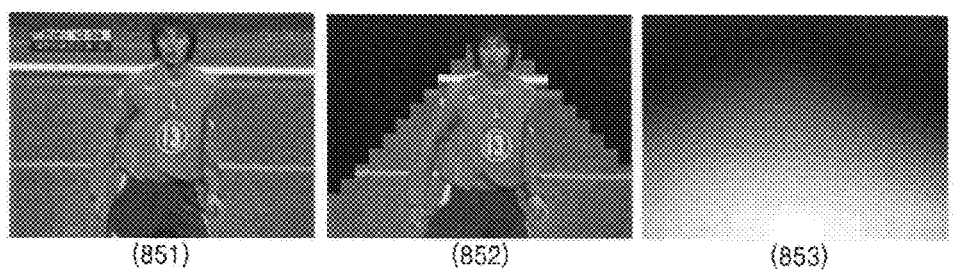

FIG. 8D illustrates a process of generating a gradient depth map based on an object in an NL2 image. In FIG. 8D, reference numerals 851, 852 and 853 respectively represent the NL2 image, an extracted object region and the generated gradient depth map.

Figure 9:
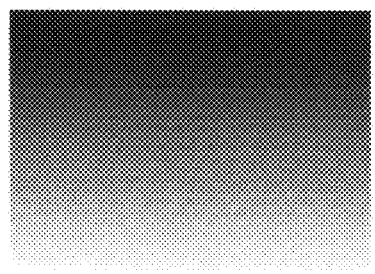
FIG. 9 illustrates an image for explaining an operation of generating a depth map when a non-long shot image corresponds to an image having an object that is not surrounded by the ground and an object does not exist in the non-long shot image.

Referring back to FIG. 4, when the position of the object is not detected in operation 425, that is, when the non-long shot image corresponds to an NL3 image, a depth value gradually varied along a specific direction of the overall video image is calculated in operation 434. For example, when the video image represents an audience area, it is difficult to detect the skin of a specific object and to respectively represent the depths of a plurality of small objects (audience). Accordingly, in the case of an NL3 image, a gradient depth map in which the upper part of the image has a depth value greater than that of the lower part of the image is generated. FIG. 9 illustrates a depth map with respect to the whole NL3 image generated through the aforementioned method.

Exemplary embodiments of generating a depth map for converting a 2D video image to a 3D stereoscopic image have been described. According to exemplary embodiments of the present invention, a video image is classified on the basis of a distribution value of the ground of the video image extracted from the video image and characteristic depth values are calculated according to the classified type of the video image. Accordingly, a sense of space and perspective can be effectively given to even a long shot image in which the ground occupies a large part of the image and a stereoscopic image recognizable by a viewer can be generated even if rapid object change is made between scenes in a video image.

A parallax is generated using a depth map generated through the above-described method according to Equation 14.

$$\mathrm{Parallax}(x, y) = \mathrm{Max\_Parallax} \times \left(1 - \frac{\mathrm{Depth}(x, y)}{\mathrm{Max\_Depth}}\right) \quad [\text{Equation 14}]$$

Here, Parallax(x, y) represents a parallax between left and right images at the coordinates (x, y) of a pixel, Depth(x, y) represents a generated depth map, Max_Parallax denotes a maximum parallax value of the left and right images recognizable by people, and Max_Depth denotes a maximum depth value. A final stereoscopic image can be obtained by moving the pixel at (x, y) in the input video image by the parallax value Parallax(x, y) calculated through Equation 14 in the horizontal direction.

Figure 10A:
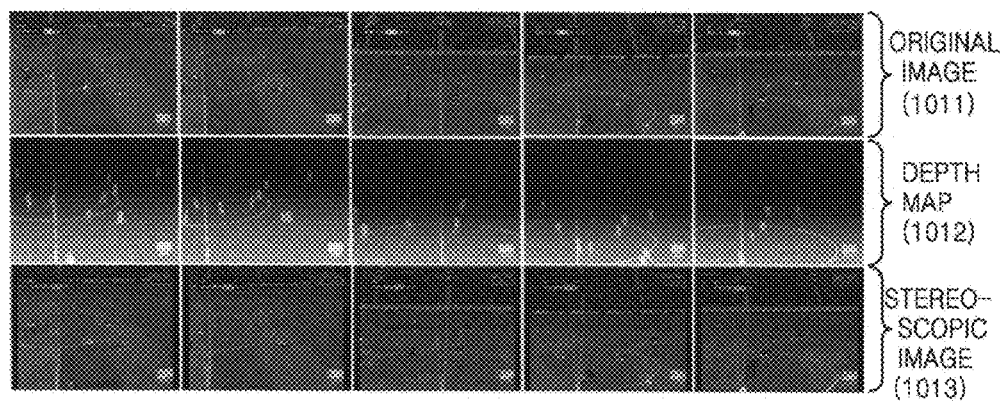
FIGS. 10A, 10B, 10C and 10D illustrate 2D original images, depth maps generated from the 2D original images and 3D stereoscopic images generated using the depth maps.

FIGS. 10A, 10B, 10C and 10D illustrate depth maps generated from different types of 2D images and 3D stereoscopic images respectively generated using the depth maps. Referring to FIG. 10A, a depth map 1012 is generated from a long shot image 1011 and a stereoscopic image 1013 is generated by moving the long shot image 1011 by a parallax value. It can be confirmed from the depth map 1012 that a depth value of the ground is gradually varied and objects are whiter than the neighboring ground.

Figure 10B:
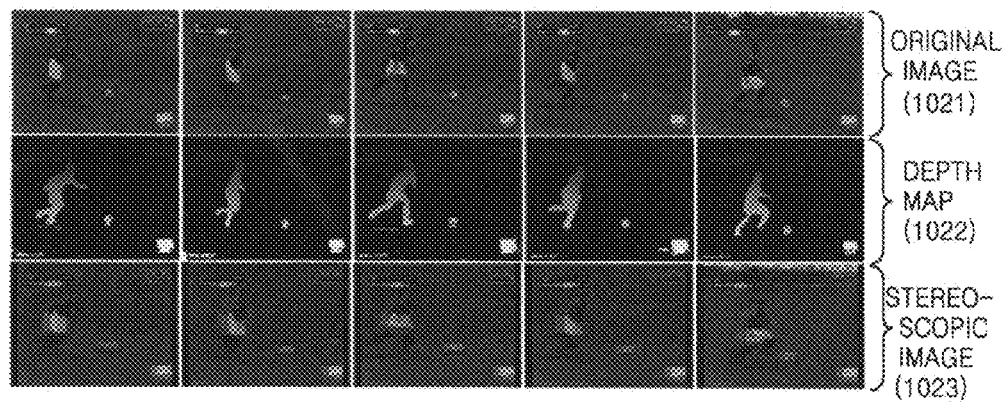

Referring to FIG. 10B, a depth map 1022 is generated from an NL1 image 1021 and a stereoscopic image 1023 is generated by moving the NL1 image 1021 by a parallax value. It can be confirmed from the depth map 1022 that the ground has a maximum depth value corresponding to black and depth values of objects are gradually varied.

Figure 10C:

Referring to FIG. 10C, a depth map 1032 is generated from an NL2 image 1031 and a stereoscopic image 1033 is generated by moving the NL2 image 1031 by a parallax value. It can be confirmed from the depth map 1032 that the ground has a maximum depth value corresponding to black and depth values are gradually varied based on the object.

Figure 10D:

Referring to FIG. 10D, a depth map 1042 is generated from an NL3 image 1041 and a stereoscopic image 1043 is generated by moving the NL3 image 1041 by a parallax value. It can be confirmed from the depth map 1042 that depth values are gradually varied over the entire image.

According to the current exemplary embodiment of the present invention, a depth value can be effectively calculated according to characteristic of each scene of a video image so as to provide a stereoscopic image to viewers.

In addition to the above described exemplary embodiments, exemplary embodiments of the present invention can also be implemented through computer readable code/instructions in/on a medium, e.g., a computer readable medium, to control at least one processing element to implement any above described exemplary embodiment. The medium can correspond to any medium/media permitting the storing of the computer readable code/instructions.

The computer readable code/instructions can be recorded on a medium in a variety of ways, with examples of the medium including computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), a CD-R (Recordable)/Rewritable, and DVD-R (Recordable/Rewritable). The media may also be a distributed network, so that the computer readable code/instructions is/are stored and executed in a distributed fashion. Still further, as only an example, the processing element could include a processor or a computer processor, and processing elements may be distributed and/or included in a single device.

For example, exemplary embodiments can be implemented in computing hardware (computing apparatus) and/or software, such as (in a non-limiting example) any computer that can store, retrieve, process and/or output data and/or communicate with other computers. Software includes computer readable code/instructions. The computer readable code/instructions may form a program. The results produced by the implementation of the software can be displayed on a display of the computing hardware. A program/software implementing exemplary embodiments may be recorded on computer-readable media comprising computer-readable recording media discussed above.

Further, according to an aspect of exemplary embodiments, any combination of the described features, functions and/or operations can be implemented.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A method for generating a depth map implemented by at least one processing element, the method comprising:

extracting the ground of a video image, wherein the ground has image characteristic distinguished from an object of the video image;

classifying the video image as a long shot image or a non-long shot image based on a distribution value of the extracted ground;

analyzing the video image and performing object detection in consideration of a distribution value of the extracted ground and a distribution value of a ground at the end of the video image when the video image corresponds to the non-long shot image;

calculating a depth value gradually varied along a predetermined direction of the extracted ground when the video image corresponds to the long shot image and calculating depth value based on the object as a result of the object detection when the video image corresponds to the non-long shot image; and generating the depth map based on the depth value.

2. The method of claim 1, wherein the ground has uniform color characteristic and the extracting of the ground comprises extracting the ground having the uniform color characteristic from the video image using a predetermined ground detection algorithm.

3. The method of claim 1, wherein the calculating of the depth value comprises calculating the depth value gradually varied from one end of the extracted ground to the other end of the extracted ground along the predetermined direction and calculating the depth value of the object such that the object has depth value higher than that of the neighboring ground when the video image corresponds to the long shot image.

4. The method of claim 1, further comprising when the non-long shot image corresponds to an image having an object surrounded by the ground according to the analysis result, the calculating of the depth value comprises calculating a depth value gradually varied along a predetermined direction of the object.

5. The method of claim 1, further comprising when the non-long shot image corresponds to an image having an object that is not surrounded by the ground according to the analysis result, the calculating of the depth value comprises calculating a depth value using a predetermined color of the object.

6. The method of claim 5, further comprising detecting the position of the object using the predetermined color of the object and, when the position of the object exists according to the detection result, the calculating of the depth value of the non-long shot image comprises calculating a depth value gradually varied from the center of the detected position of the object.

7. The method of claim 5, further comprising detecting the position of the object using the predetermined color of the object and, when the position of the object does not exist according to the detection result, the calculating of the depth value of the non-long shot image comprises calculating a depth value gradually varied along a predetermined direction of the overall video image.

8. The method of claim 1, further comprising checking image continuity between a current frame and a previous frame of the video image, wherein the classifying of the video image as the long shot image or the non-long shot image is selectively performed according to the checking result.

9. A nontransitory computer readable recording medium storing a program to be executed to implement the method of claim 1 on a computer.

10. A system generating a depth map, the system comprising:

a ground extractor to extract the ground of a video image, wherein the ground has image characteristic distinguished from an object of the video image;

an image classification unit to classify the video image as a long shot image or a non-long shot image based on a distribution value of the extracted ground;

an image analyzer to analyze the video image and to perform object detection in consideration of the distribution value of the extracted ground and a distribution value of a ground at the end of the video image when the video image corresponds to the non-long shot image; and a depth value calculator, using at least one processing element, to calculate a depth value gradually varied along a predetermined direction of the extracted ground in order to generate the depth map when the video image corresponds to the long shot image and to calculate depth value based on the object in order to generate the depth map as a result of the object detection when the video image corresponds to the non-long shot image.

11. The system of claim 10, wherein the ground has uniform color characteristic and the ground extractor extracts the ground having the uniform color characteristic from the video image using a predetermined ground detection algorithm.

12. The system of claim 10, wherein the depth value calculator calculates a depth value gradually varied from one end of the extracted ground to the other end along the predetermined direction and calculates a depth value of the object such that the object has a depth value higher than that of the neighboring ground when the video image corresponds to the long shot image.

13. The system of claim 10, further comprising when the non-long shot image corresponds to an image having an object surrounded by the ground according to the analysis result, the depth value calculator calculates a depth value gradually varied along a predetermined direction of the object.

14. The system of claim 10, further comprising when the non-long shot image corresponds to an image having an object that is not surrounded by the ground according to the analysis result, the depth value calculator calculates a depth value using a predetermined color of the object.

15. The system of claim 14, further comprising an object position detector to detect the position of the object using the predetermined color of the object and, when the position of the object exists according to the detection result, the depth value calculator calculates a depth value gradually varied from the center of the detected position of the object.

16. The system of claim 14, further comprising an object position detector to detect the position of the object using the predetermined color of the object and, when the position of the object does not exist according to the detection result, the depth value calculator calculates a depth value gradually varied along a predetermined direction of the overall video image.

17. The system of claim 10, further comprising a continuity checking unit to check image continuity between a current frame and a previous frame of the video image and the image classification unit selectively classifies the video image according to the checking result.

18. At least one nontransitory computer readable recording medium storing computer readable instructions that control at least one processing element to implement the method of claim 1.

19. The method of claim 1, further comprising:

generating the stereoscopic image based on the depth map; and displaying the stereoscopic image on a display unit.

20. The system of claim 10 further comprising:
a stereoscopic image generator to generate the stereoscopic image based on the depth map; and
a display unit to display the stereoscopic image.

* * * * *

UNITED STATES PATENT AND TRADEMARK OFFICE
CERTIFICATE OF CORRECTION

| | | |
|---|---|---|
| PATENT NO. | : 8,565,512 B2 | Page 1 of 1 |
| APPLICATION NO. | : 12/155134 | |
| DATED | : October 22, 2013 | |
| INVENTOR(S) | : Yong Ju Jung et al. | |

It is certified that error appears in the above-identified patent and that said Letters Patent is hereby corrected as shown below:

On the Title Page, In Column 2 (Other Publications), Line 5, Delete "Intellegent" and insert
-- Intelligent --, therefor.

On the Title Page, In Column 2 (Other Publications), Line 11, Delete "Edtion" and insert -- Edition --, therefor.

Signed and Sealed this
Eighteenth Day of February, 2014

Michelle K. Lee
*Deputy Director of the United States Patent and Trademark Office*